(12) United States Patent
Lim et al.

(10) Patent No.: US 8,948,308 B2
(45) Date of Patent: Feb. 3, 2015

(54) APPARATUS AND METHOD OF TRANSMITTING HIERARCHICALLY MODULATED SIGNAL

(71) Applicant: Electronics and Telecommunications Research Institute, Daejeon-si (KR)

(72) Inventors: Hyoung Soo Lim, Daejeon-si (KR); Tae Jin Jung, Gwangju-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 13 days.

(21) Appl. No.: 13/860,647

(22) Filed: Apr. 11, 2013

(65) Prior Publication Data

US 2013/0272451 A1    Oct. 17, 2013

(30) Foreign Application Priority Data

Apr. 13, 2012   (KR) .................. 10-2012-0038230

(51) Int. Cl.
| | |
|---|---|
| *H04L 27/20* | (2006.01) |
| *H04L 27/18* | (2006.01) |
| *H04L 27/26* | (2006.01) |
| *H04L 27/34* | (2006.01) |

(52) U.S. Cl.
CPC .............. *H04L 27/20* (2013.01); *H04L 27/183* (2013.01); *H04L 27/2604* (2013.01); *H04L 27/3488* (2013.01)
USPC ............ 375/308; 375/260; 375/295; 375/302

(58) Field of Classification Search
CPC ..... H04L 5/0007; H04L 5/0021; H04L 5/023; H04L 5/009; H04L 27/20; H04L 27/183; H04L 27/2604; H04L 27/3488; H04W 52/0245

USPC ................................ 375/260, 295, 302, 308
See application file for complete search history.

(56) References Cited

U.S. PATENT DOCUMENTS

| | | | | |
|---|---|---|---|---|
| 7,570,694 | B2 | 8/2009 | Le Goff | |
| 7,725,799 | B2 * | 5/2010 | Walker et al. | 714/755 |
| 7,826,548 | B2 * | 11/2010 | Wang et al. | 375/267 |

FOREIGN PATENT DOCUMENTS

| | | |
|---|---|---|
| KR | 1020080052201 A | 6/2008 |
| KR | 1020100071811 A | 6/2010 |

* cited by examiner

*Primary Examiner* — Leon Flores
(74) *Attorney, Agent, or Firm* — Ladas & Parry LLP

(57) ABSTRACT

An apparatus and a method of transmitting hierarchically modulated signals are provided. The present invention includes: a basic layer symbol generator generating a first layer signal; an enhancement layer symbol generator generating a second layer signal synchronized with the first layer signal and having different signal power; and a hierarchical modulator hierarchically modulating the first layer signal and the second layer signal, wherein the enhancement layer symbol generator performs constellation rotation rotating bundles configured as constellation points formed by the second layer signal based on constellation points of the first layer signal by a predetermined angle. According to the exemplary embodiment of the present invention, it is possible to improve the receiving performance of the second layer signals by applying the constellation rotation technology to the second layer signals in regards of the signal transmission system using the hierarchical modulation technology.

18 Claims, 14 Drawing Sheets

APPARATUS AND METHOD OF TRANSMITTING HIERARCHICALLY MODULATED SIGNAL

CROSS-REFERENCE TO RELATED APPLICATIONS

This application claims the benefit of priority of Korean Patent Application No. 10-2019-0038230 filed on Apr. 13, 2012, all of which are incorporated by reference in their entirety herein.

BACKGROUND OF THE INVENTION

1. Field of the Invention

The present invention relates to radio communication systems, and more particularly, to an apparatus and a method of transmitting hierarchically modulated signals in radio communication systems.

2. Related Art

Non-uniform constellation of a digital video broadcasting-terrestrial (DVB-T) standard is not used in actual broadcasting environments due to the efficiency and performance thereof. Meanwhile, a DVB-T2 standard, a second-generation terrestrial. TV standard in Europe that is not compatible with the existing DVB-T standard does not adopt a hierarchical modulation technology. As compared with the existing DVB-T, various transmission technologies have been adopted in order to improve transmission efficiency and receive performance.

A need exists for a method of improving transmission efficiency while maintaining compatibility with the existing transmission system such as DVB-T, digital video broadcasting—satellite 2nd generation (DVB-S2), or advanced terrestrial-digital multimedia broadcasting (AT-DME)

SUMMARY OF THE INVENTION

The present invention provides an apparatus and a method of transmitting hierarchically modulated signals in radio communication systems.

The present invention also provides an apparatus and a method of simultaneously performing constellation rotation and hierarchical modulation.

In an aspect, there is provided a transmitter for transmitting signals in radio communication systems including: a basic layer symbol generator generating a first in layer signal; an enhancement layer symbol generator generating a second layer signal synchronized with the first layer signal and having different signal power; and a hierarchical modulator hierarthically modulating the second layer signal, wherein the enhancement layer symbol generator performs constellation rotation rotating bundles configured as constellation points formed by the second layer signal based on die constellation points of the first layer signal by a predetermined angle.

In another aspect, there is provided a method of transmitting signals by a transmitter in radio communication systems including: generating a first layer signal; generating a second layer signal synchronized with the first layer signal and having different signal power; performing constellation rotation rotating bundles configured as constellation points formed by the second layer signal by a predetermined angle; and hierarchically modulating and transmitting the second layer signal.

In another aspect, there is provided a method of transmitting signals by a transmitter in radio communication systems including: generating a first layer signal; generating a second layer signal synchronized with the first layer signal and having different signal power and mapping the generated second layer signal to one in previously rotated second layer signal constellations stored in a predetermined look up table (LUT) according to a bitstream to be transmitted to the second layer signal; and hierarchically modulating and transmitting the first layer signal and the second layer signal.

In another aspect, there is provided a method of transmitting signals by a transmitter in radio communication systems including: generating the first layer signal and the second layer signal and mapping and transmitting, constellations to one symbol in the constellations of hierarchically modulated signals stored in a predetermine LUT according to bitstreams of the generated first layer signal and second layer signal.

DESCRIPTION OF EXEMPLARY EMBODIMENTS

Figure 1:
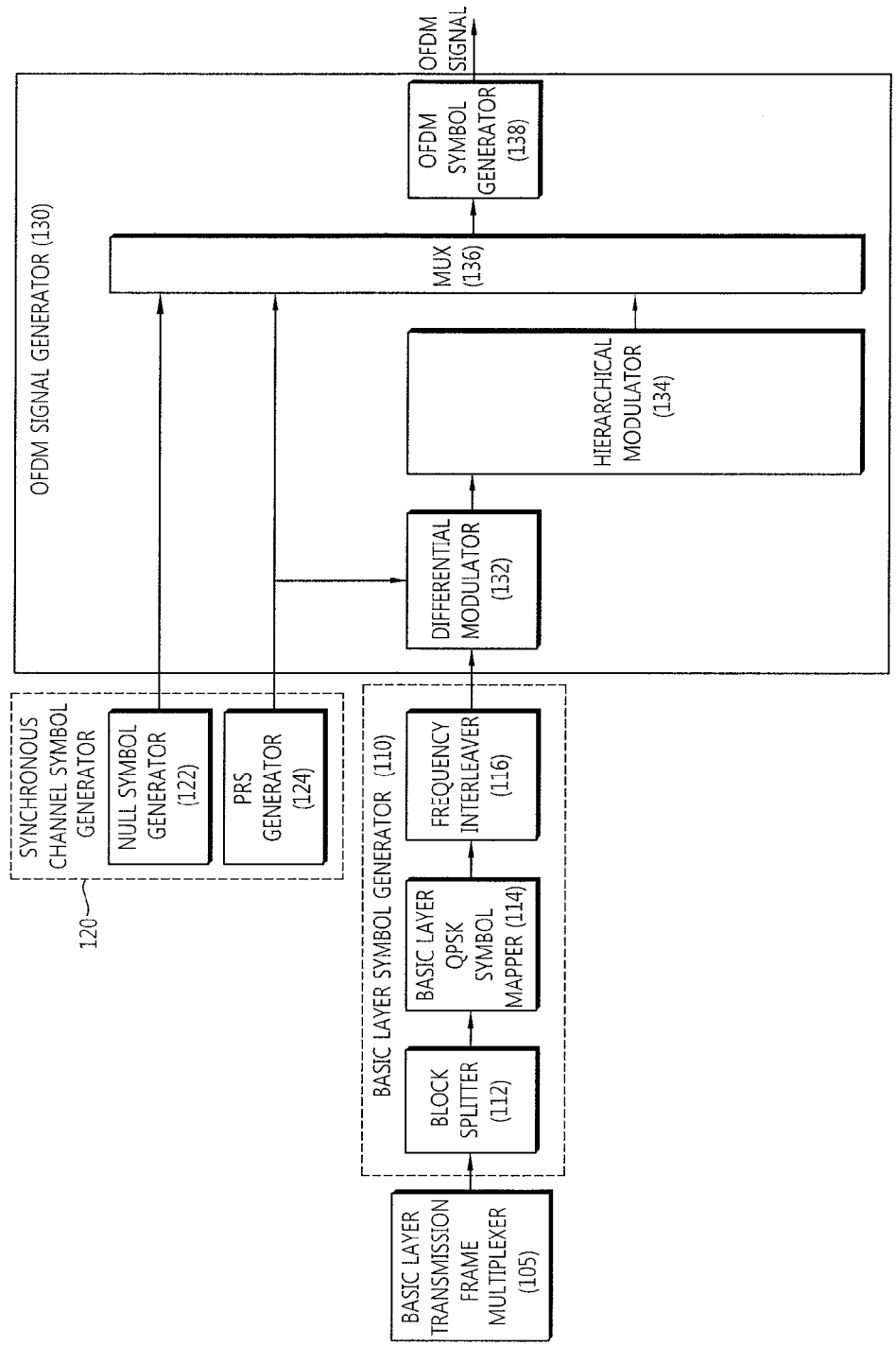
FIG. 1 is a diagram showing, an example of a T-DMB transmitter.

Hereinafter, exemplary embodiments of the present invention will be described in detail with reference to the accompanying drawings so that those skilled in the art may easily practice the present invention. However, the present invention may be implemented in various ways and is not limited to the exemplary embodiments described herein. Further, throughout the drawings, the same or similar reference numerals will be used to designate the same components or like components having the same functions in the scope of the similar idea.

FIG. 1 is a terrestrial-digital multimedia broadcast (T-DMB) transmitter.

Referring to FIG. 1, a T-DMB transmitter may include a basic layer symbol generator 110, a synchronous channel symbol generator 120, an orthogonal frequency division multiplexing (OFDM) signal generator 130 and may further include a basic layer transmission frame multiplexer 105.

The basic layer symbol generator 110 includes a block splitter 112, a basic layer quadrature phase shift keying (QPSK) symbol mapper 114, and a frequency interleaver 116. The basic layer symbol generator 110 may be a fast information channel (FIC) and main service channel (MSC) symbol generator.

The synchronous symbol generator 120 may include a NULL symbol generator 122 and a phase reference (PRS) symbol generator 124.

The OFDM signal generator 130 may include a differential modulator 132, a hierarchical modulator 134, a multiplexer (MUX) 136 and an OFDM symbol generator 138.

The basic layer transmission frame multiplexer 105 is connected to the block splitter 112, the block splitter 112 is connected to the basic layer QPSK symbol mapper 114, the basic layer QPSK symbol mapper 114 is connected to the frequency interleaver 116, and the frequency interleaver 116 is connected to the differential modulator 132.

The NULL, symbol generator 122 is connected to the MUX 136 and a PRS generator 124 is connected to the differential modulator 132 and the MUX 136.

The differential modulator 132 is connected to the hierarchical modulator 134, the hierarchical modulator 134 is connected to the MUX 136, and the MUX is connected to the OFDM symbol generator 138. The OFDM signal to be last transmitted by the T-DMB transmitter is generated in the OFDM symbol generator.

Figure 2A:
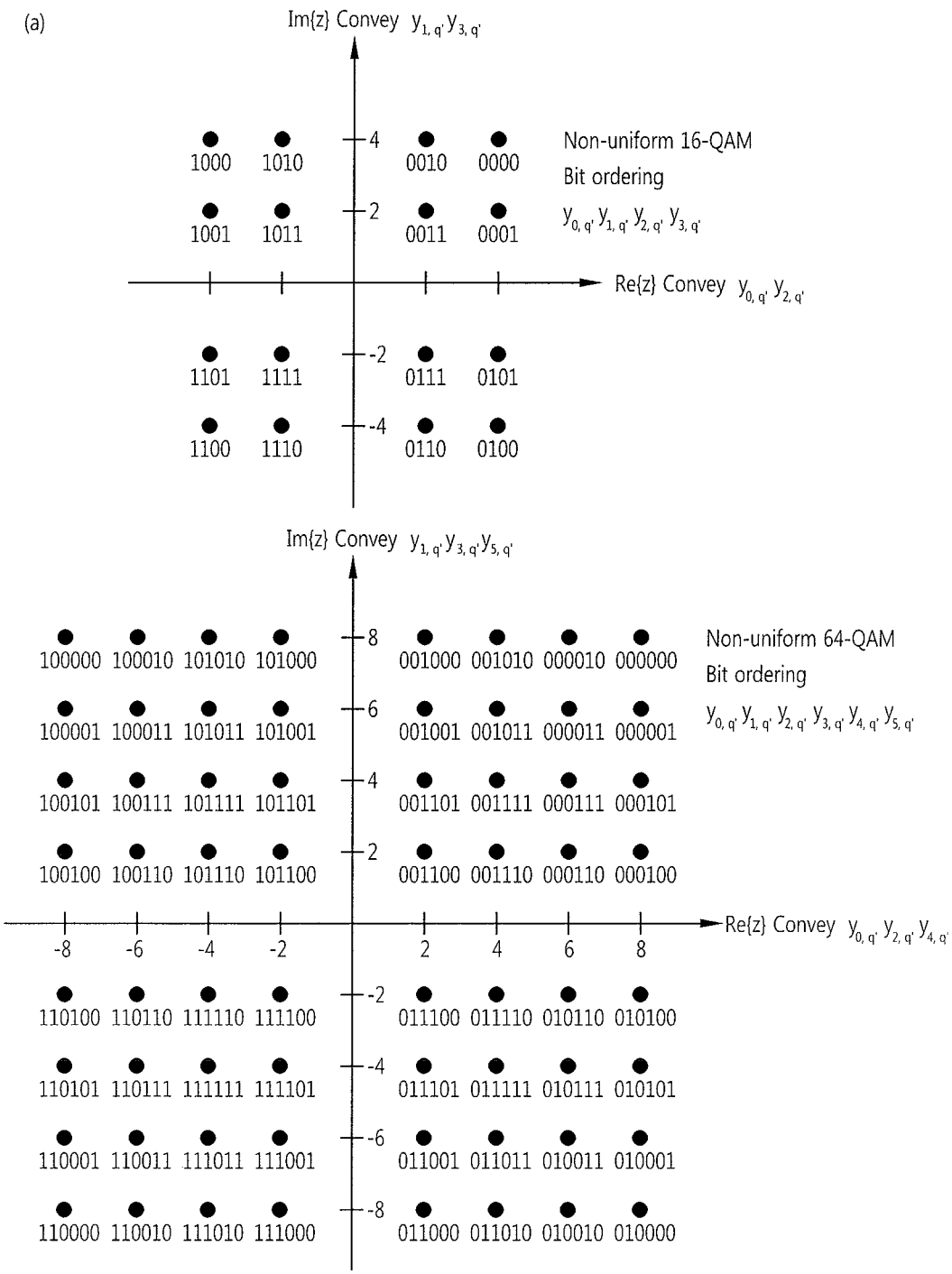
FIGS. 2A and 2B are diagrams showing an example of non uniform constellation of a DVB-T standard.
Figure 2B:
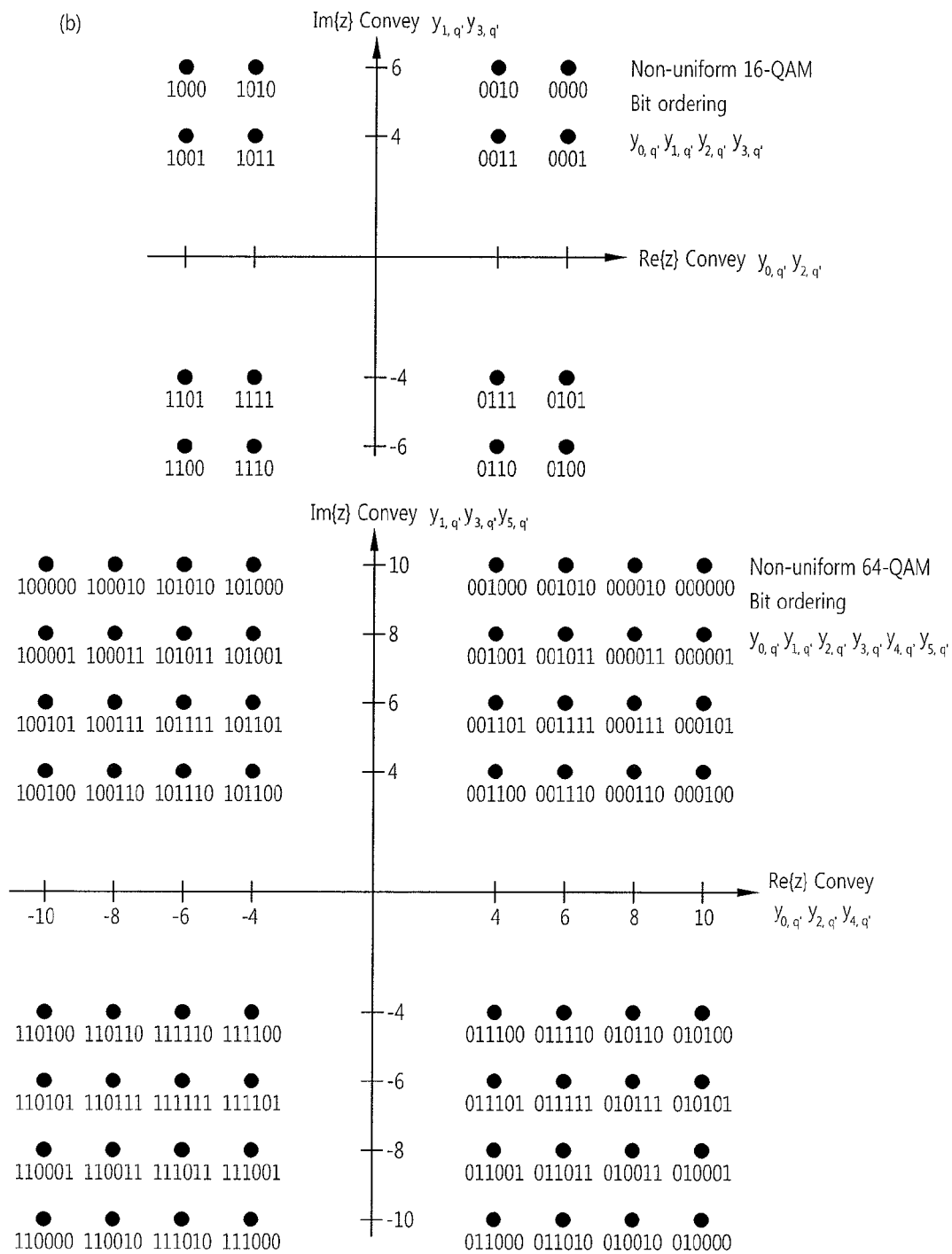

FIGS. 2A and 2B show non-uniform constellation of a digital video broadcasting-terrestrial (DVB-T) standard. In the non-uniform constellation of FIGS. 2A and 2B, constellation points for each quadrant are arranged in a lattice form at a uniform distance 2, wherein FIG. 2A shows a non-uniform constellation in which the closest inter-symbol distance between the constellation groups for each quadrant is 4 and FIG. 2B shows a non-uniform constellation in which a minimum distance between the constellation groups for each quadrant is 8. As the minimum distance between the constellation groups for each quadrant is increased, detection performance of the first layer signal is improved and detection performance of the second layer signal is degraded.

Referring to FIG. 2, the DVB-T standard that is a terrestrial digital TV broadcast transmission protocol in Europe and the satellite broadcast signal transmission protocol adopts the non-uniform constellation to provide selective services according to the receiving environments and conditions of the receiver.

Figure 3:
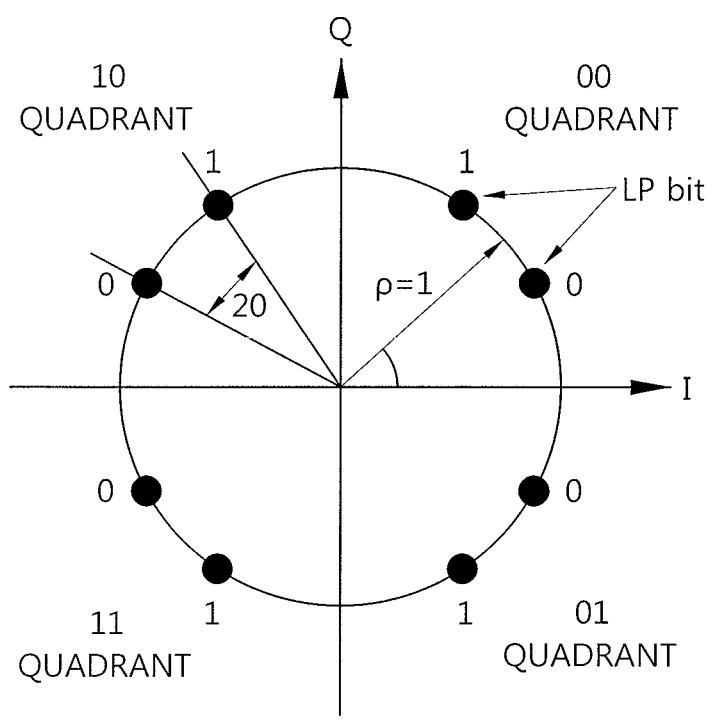
FIG. 3 is a diagram showing non-uniform constellation of a DVB-S2 standard.

FIG. 3 shows an example of the non-uniform constellation of the digital video broadcasting-satellite 2nd generation (DVB-S2) standard.

Referring to FIG. 3, a most significant bit (MSB) represents an in-phase (I) and a least significant bit (LSB) represents a quadrature-phase (Q). In the DVB-S2 standard, it is possible to improve transmission capacity while maintaining the compatibility with the digital video broadcasting-satellite DVB-S; standard by adopting the non-uniform constellation.

The non-uniform constellation adopting in the DVB-T and DVB-S2 standards is to apply a hierarchical modulation technology. The transmitter simultaneously transmits a first layer (basic layer) signal and a second layer (additional layer) signal that are synchronized with each other through the same antenna based on different signal powers and the receiver receives the hierarchically modulated signals to recover both of the first layer signal and the second layer signal or only the first layer signal according to the receiving environments and conditions.

Figure 4A:
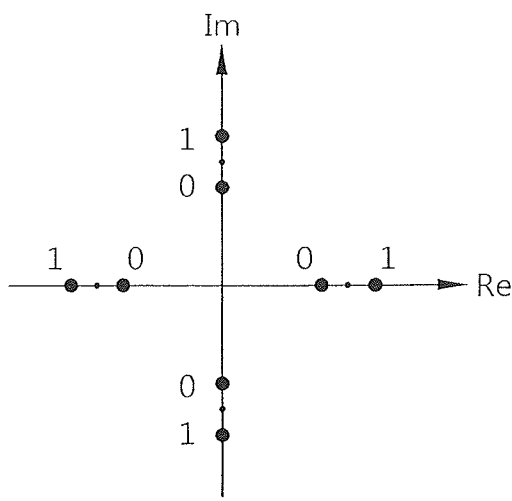
FIGS. 4A to 4D are diagrams showing non-uniform constellation of an AT-DMB standard.
Figure 4B:
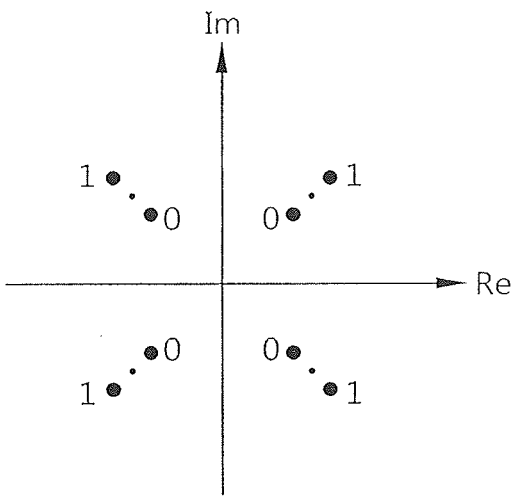
Figure 4C:
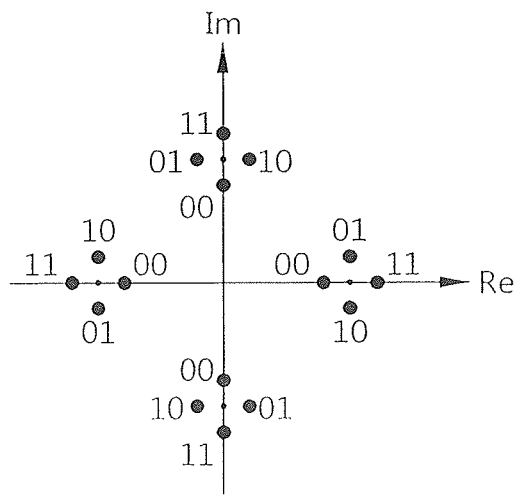
Figure 4D:
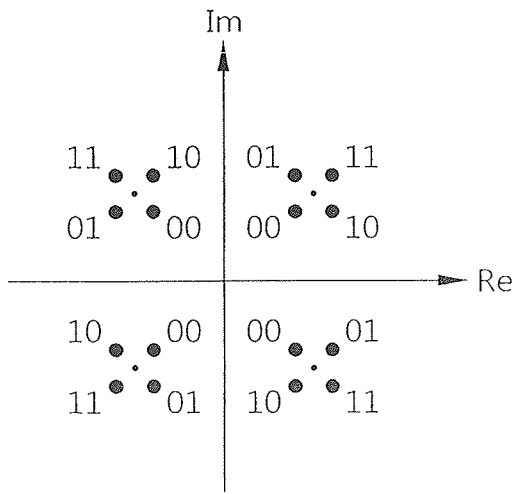

FIGS. 4A, 4B, 4C, AND 4D are diagrams showing the non-uniform constellation of an advanced T-DMB (AT-DMB) standard. FIG. 4A is the constellation of binary phase shift keying (BPSK) B mode odd-numbered symbols, FIG. 4B is the constellation of the B mode even-numbered symbols, FIG. 4C is the constellation of the quadrature phase shift keying (QPSK) Q mode odd-numbered symbols, and FIG. 4D is the constellation of the Q mode even-numbered symbols.

Referring to FIGS. 4A, 4B, 4C, and 4D, in order to improve the transmission efficiency of the T-DMB transmitter, the non-uniform constellation to which the hierarchical modulation technology is applied is also used in the AT-DMB standard. Therethrough, an AT-DMB receiver can receive services of high quality/high transmission efficiency while securing the compatibility with the T-DMB standard.

Meanwhile, in order to improve the transmission efficiency and receive performance as compared with the DVB-T, various transmission technologies are used. As the example thereof, there is a constellation rotation modulation technology.

Figure 5:
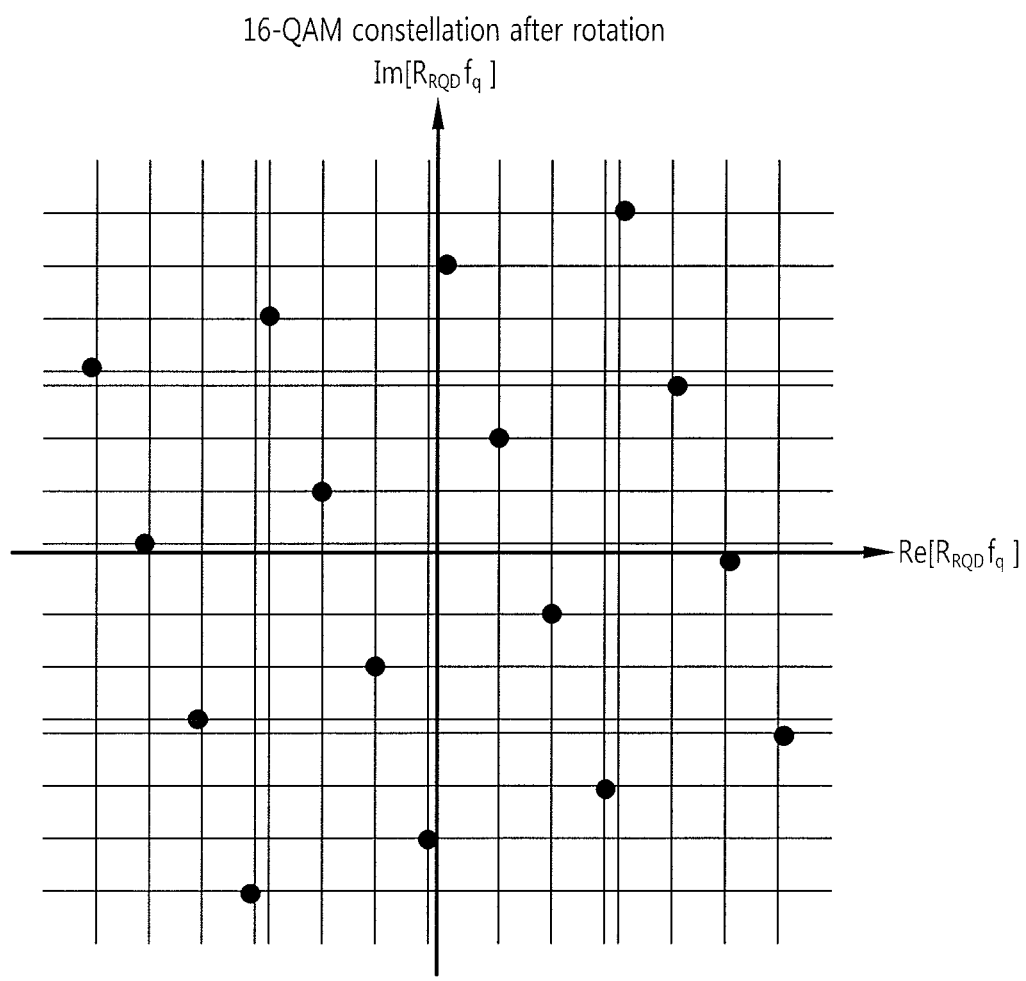
FIG. 5 is a diagram showing a constellation rotation modulation technology to which the exemplary embodiment of the present invention is applied.

FIG. 5 is a diagram showing an example of a constellation rotation modulation technology to which the exemplary embodiment of the present invention is applied.

Referring to FIG. 5, the constellation rotation modulation technology can additionally obtain a diversity effects corresponding to constellation dimension and improve the receive performance by being coupled with an interleaving technology, as compared with a general modulation technology.

The apparatus and method of transmitting hierarchically modulated signals according to the exemplary embodiment of the present invention will now be described. The application examples of the constellation rotation technology to the AT-DMB system in order to facilitate descriptions and avoid the repetition of unnecessary contents in the specification will be described. However, the scope of the present invention is not limited thereto and the present invention may be applied to the DVB-T, DVB-S, and DVBS2 systems or the T-DMB system.

Figure 6:
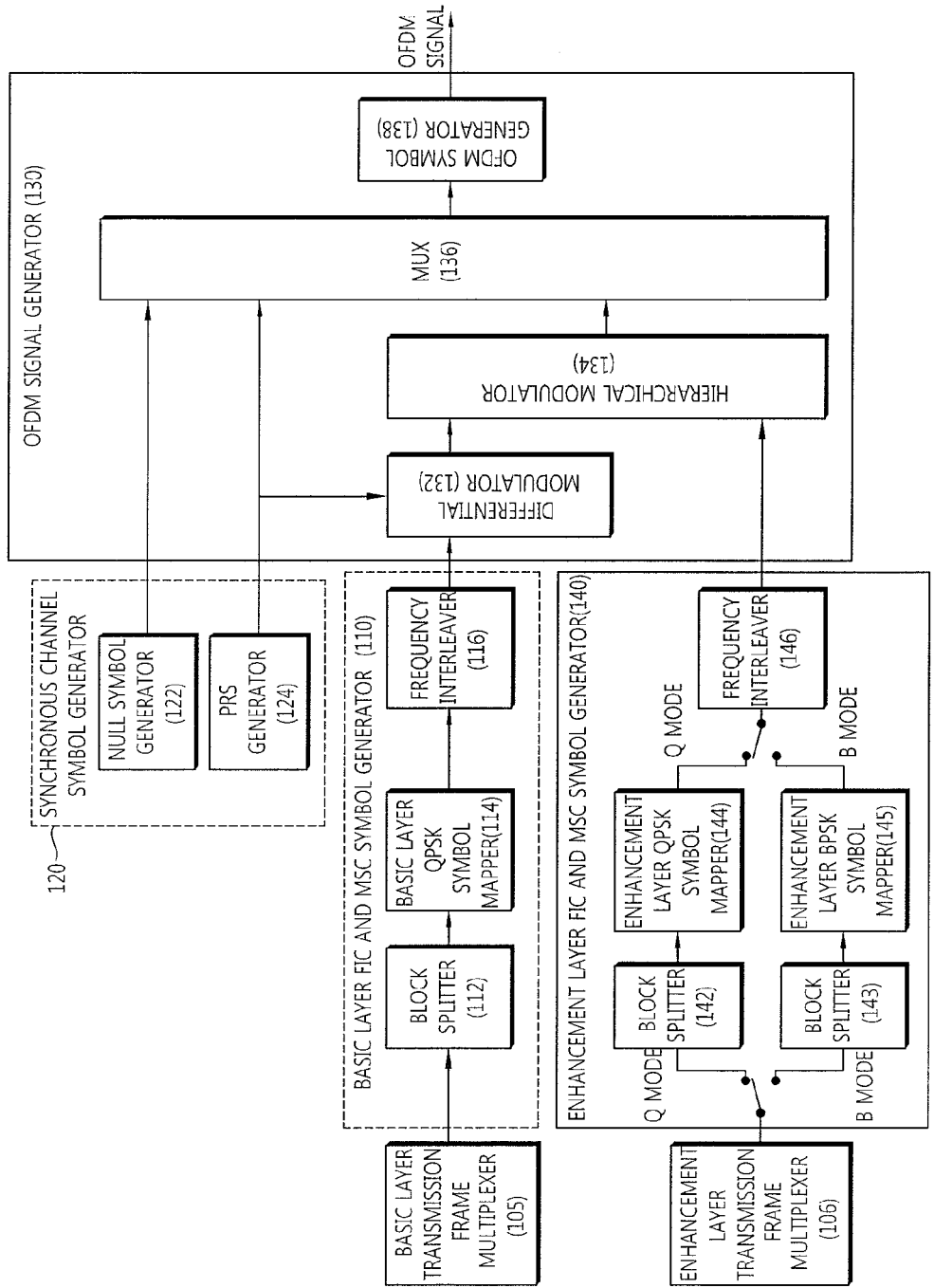
FIG. 6 is a block diagram showing an example of an AT-DMB transmitter.

FIG. 6 is a block diagram showing an AT-DMB transmitter.

Referring to FIG. 6, a transmitter additionally transmits the second layer signal to which a new channel code is applied through the hierarchical modulation technology. The T-DMB transmitter of FIG. 1 further includes the enhancement layer transmission frame multiplexer 105 and the enhancement layer symbol generator 140. The enhancement layer symbol generator 140 may be the enhancement layer FIC and MSC symbol generators.

In an embodiment of the present invention, the constellation rotation modulation technology is applied only to the enhancement layer symbol generator 140 without changing the T-DMB signal that is the first layer (basic layer) signal, thereby making it possible to improve the receive performance of the second layer (enhancement layer) signal while maintaining the compatibility with the T-DMB system.

The enhancement layer symbol generator 140 includes a block splitter 142 for a Q mode and an enhancement layer QPSK, symbol mapper 144, a block splitter 143 for a B mode and an enhancement layer BPSK symbol mapper 145, and a frequency interleaver 146.

The enhancement layer symbol generator may select the Q mode and the B mode, the enhancement layer transmission frame multiplexer 106 for the Q mode is connected to the block splitter 142, the block splitter 142 is connected to the enhancement layer QPSK symbol mapper 144, and the enhancement layer QPSK symbol mapper 144 is connected to the frequency interleaver 146. The enhancement layer transmission frame multiplexer 106 for the B mode is connected to the block splitter 143, the block splitter 143 is connected to the enhancement layer QPSK symbol mapper 145, and the enhancement layer BPSK symbol mapper 145 is connected to the frequency interleaver 146. In the Q mode or the B mode, the frequency interleaver 146 is connected to the hierarchical modulator 134.

The hierarchical modulator 134 hierarchically modulates symbols generated from the basic layer symbol generator 110 and symbols generated from the enhancement layer symbol generator 140, inputs the hierarchically modulated symbols to the MUX 136, and transmits the OFDM symbols via the OFDM symbol generator 138.

In an example of the AT-DMB transmitter, the enhancement layer signal acts as an interference signal for the basic layer signal upon the receiving operation of the existing T-DMB receiver and thus, the transmit power of the enhancement layer signal needs to be sufficiently smaller than that of the basic layer signal. Therefore, securing the receive performance of the enhancement layer signal becomes an important technical problem due to the low transmit power.

The constellation rotation modulation technology used for the DVB-T2 standard, and the like, among the technologies for securing receive performance is applied to the enhancement layer symbol generator 140, thereby generating the symbols. However, this may be identically applied to all of the hierarchically modulated signals including the basic layer symbols and the enhancement layer symbols. Therefore, in the case of the T-DMB and AT-DMB systems in which a differential-quadrature phase shift keying (D-QPSK) technology that is one of the differential phase modulation technologies is applied to the basic layer signal, applying phase rotation of a constant angle to all of the signals does not have any effect. Meanwhile, in the case of the DVB-T system in which coherent modulation technologies such as a quadrature phase shift keying (QPSK), a quadrature amplitude modulation (QAM), and the like, rather than the differential phase modulation technologies are applied, the constellation rotation can improve the receive performance but in the case of the existing DVB-T receiver that is not designed in consideration of the constellation rotation, the performance of the receiver may be greatly degraded.

Therefore, the exemplary embodiment of the present invention applies the constellation rotation modulation technology to the enhancement layer signal in order to improve the receive performance as compared with the existing AT-DMB transmission scheme. That is, the hierarchical modulator 134 according to the exemplary embodiment of the present invention may modulate the first layer signal (or basic layer signal) to which the constellation rotation technology is not applied and only the second layer signal (or enhancement layer signal) to which the constellation rotation technology is applied.

Figure 7A:
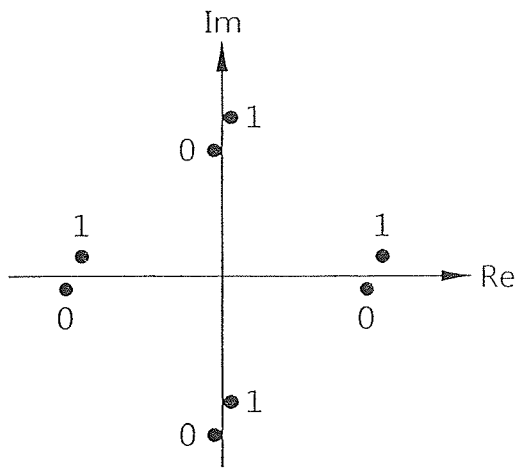
FIGS. 7AA, 7AB, 7AC, 7AD, 7BA 7BB, 7BC, and 7BD are diagrams showing constellation obtained by applying a constellation rotation technology to only a second layer signal in regards of the AT-DMB symbol constellation according to the exemplary embodiment of the present invention.
Figure 7A:
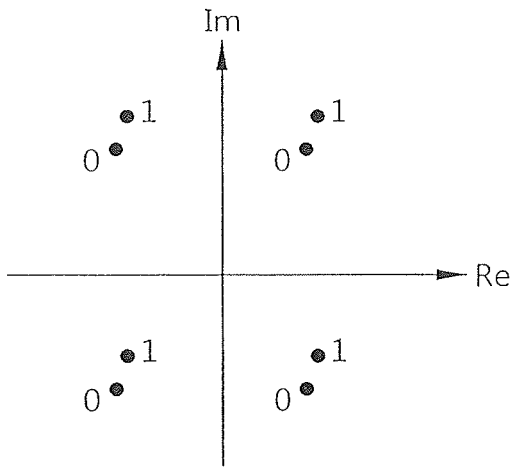
Figure 7A:
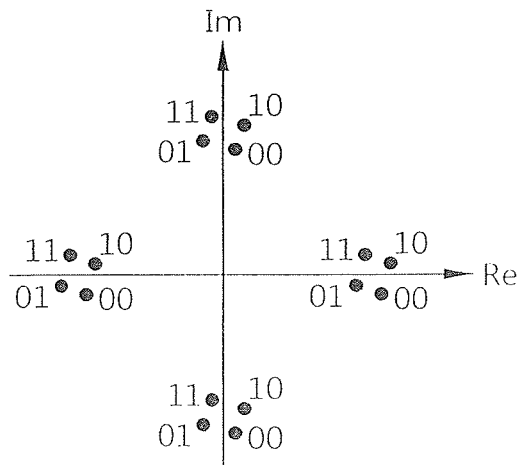
Figure 7A:
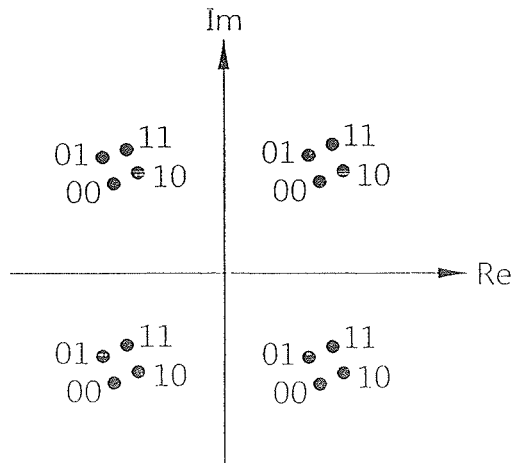
Figure 7B:
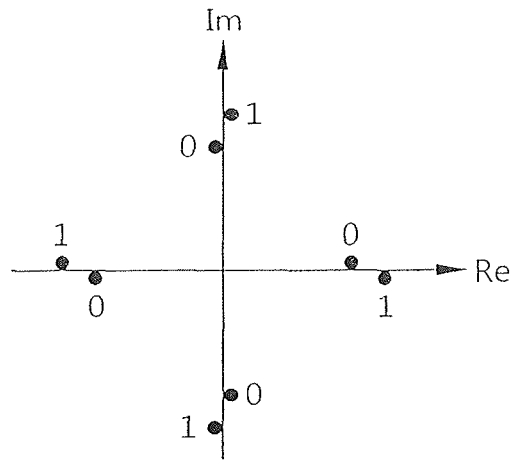
Figure 7B:
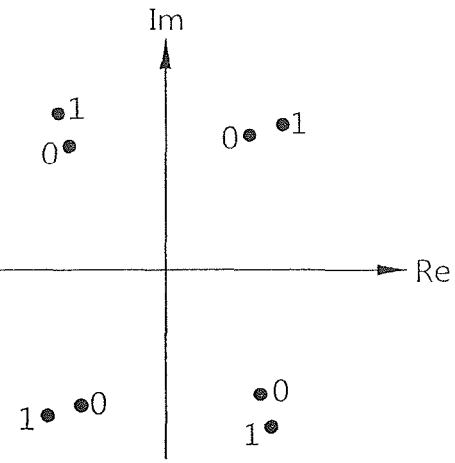
Figure 7B:
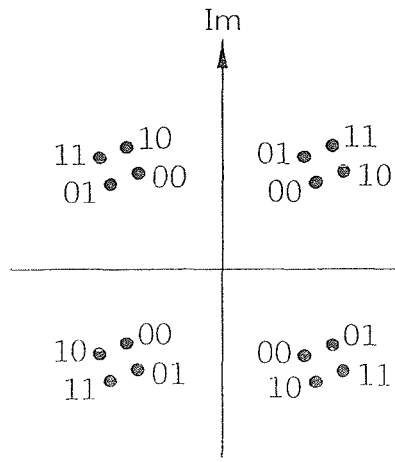
Figure 7B:
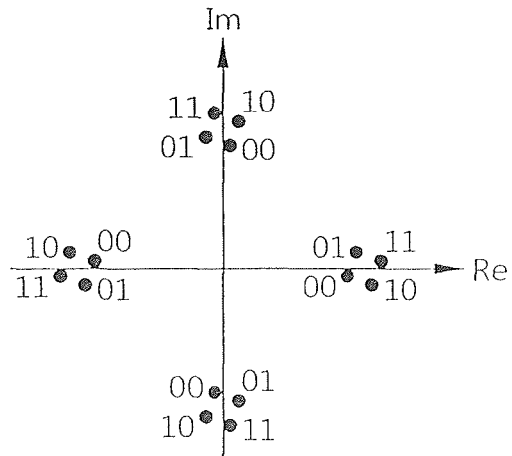

FIGS. 7AA TO 7BD show an example of the constellation obtained by applying the constellation rotation technology only the second layer signal for the AT-DMB symbol constellation. FIGS. 7AA TO 7BD show two examples that may be designed according to a hierarchically modulated method. That is, FIGS. 7AA TO 7AD show constellation obtained by performing the hierarchical modulation in a method of reducing power of the second layer signal to which the constellation rotation is applied and then, simply adding the second layer signal to the first layer signal and FIGS. 7BA TO 7BD shows constellation obtained by performing the hierarchical modulation in a method of rotating a phase of the second layer signal by the same angle as a phase of the first layer signal and adding the second layer signal to the first layer signal during a process for reducing the power of the second layer signal to which the constellation rotation is applied. In both FIGS. 7AA to 7BD, FIGS. 7AA and 7BA are the constellation of the B mode odd-numbered symbols, FIGS. 7AB and 7BB are the constellation of the B mode even-numbered symbols, FIGS. 7AC and 7BC are the constellation of the Q mode odd-numbered symbols, and FIGS. 7AD and 7BD are the constellation of the Q mode even-numbered symbols.

Referring to FIGS. 7AA TO 7BD, bundles configured as constellation points formed by the second layer signal based on four first layer signal constellation points, respectively, rotate by a predetermined angle. For example, in the case of the B mode, bundles configured as two constellation points are each rotated by a predetermined angle and in the case of the Q mode, bundles configured as four constellation points are each rotated by a predetermined angle. In this case, a predetermined rotating angle of the bundles of each constellation point may be set to maximize a diversity gain.

For example, in the AT-DMB transmitter, the predetermined rotating angle may be set to have different values according to the modulated method (B mode or Q mode) of the second layer signal to which the constellation rotation is applied.

Figure 8:
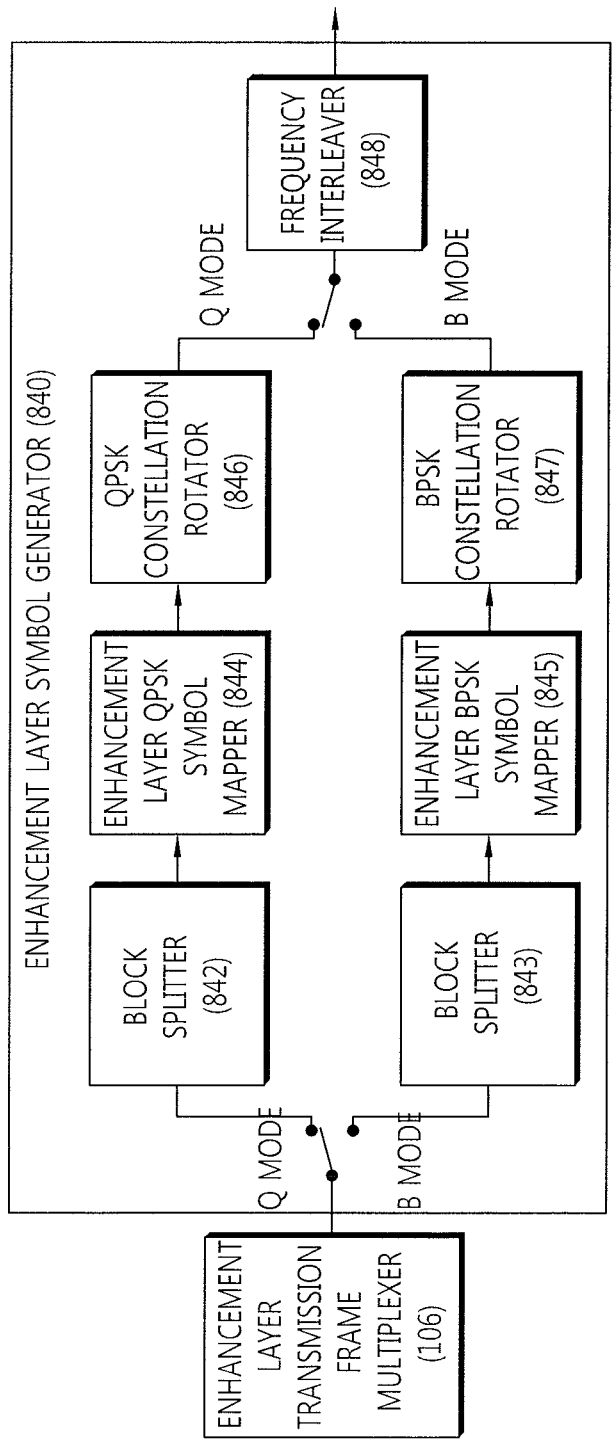
FIG. 8 is a block diagram showing an example of an enhancement layer symbol generator to which the constellation rotation is applied.

FIG. 8 is a block diagram showing an example of applying the constellation rotation to the enhancement layer symbol generator of the AT-DMB transmitter. The enhancement layer symbol generator may be the enhancement FIC and MSC symbol generator.

Referring to FIG. 8, an enhancement layer symbol generator 840 includes a block splitter 842 for a Q mode, an enhancement layer QPSK symbol mapper 844, and an QPSK constellation rotator 846 performing the QPSK constellation rotation. In addition, the enhancement layer symbol generator 840 includes a block splitter 843 for a B mode, an enhancement layer BPSK symbol mapper 845, and a BPSK constellation rotator 847 performing the BPSK constellation rotation. Further, the enhancement layer symbol generator 840 includes a frequency interleaver 848.

The enhancement layer symbol generator 840 may select the Q mode and the B mode, the enhancement layer transmission frame multiplexer 106 for the Q mode is connected to the block splitter 842, the block splitter 842 is connected to the enhancement layer QPSK symbol mapper 844, the enhancement layer QPSK symbol mapper 844 is connected to the QPSK constellation rotator 846, and the QPSK constellation rotator 846 is connected to the frequency interleaver 848. The enhancement layer transmission frame multiplexer 106 for the B mode is connected to the block splitter 843, the block splitter 843 is connected to the enhancement layer BPSK symbol mapper 845, the enhancement layer BPSK symbol mapper 845 is connected to the BPSK constellation rotator 847, and the BPSK constellation rotator 847 is connected to the frequency interleaver 848. In the Q mode or the B mode, the frequency interleaver 848 is connected to the hierarchical modulator 134. The hierarchical modulator 134 is identically operated with FIG. 6.

Immediately after the symbol mapper (the enhancement layer QPSK symbol mapper 844 and the enhancement layer BPSK symbol mapper 845) of the second layer signal, the constellation rotation is applied in the QPSK constellation rotator 846 or the BPSK constellation rotator 848.

However, as shown in FIG. 8, when only the frequency interleaving is simply applied to the enhancement layer symbols to which the constellation rotation is applied, the enhancement layer symbol information is distributed to both of the in-phase (I) component and quadrature-phase (Q) component according to the result of the constellation rotation but a pair of the in-phase (I) component and the quadrature-phase (Q) component configure the same symbol even after the frequency interleaving and thus, cannot obtain the diversity gain according to the constellation rotation. Therefore, in order to obtain the diversity gain according to the constellation rotation, separate interleaving is applied to the in-phase (I) component and quadrature-phase (Q) component of the constellation-rotated symbols and as a result, the in-phase (I) component and the quadrature-phase (Q) component of the constellation-rotated symbols need to be designed to be transmitted to independent channels from each other.

Figure 9:
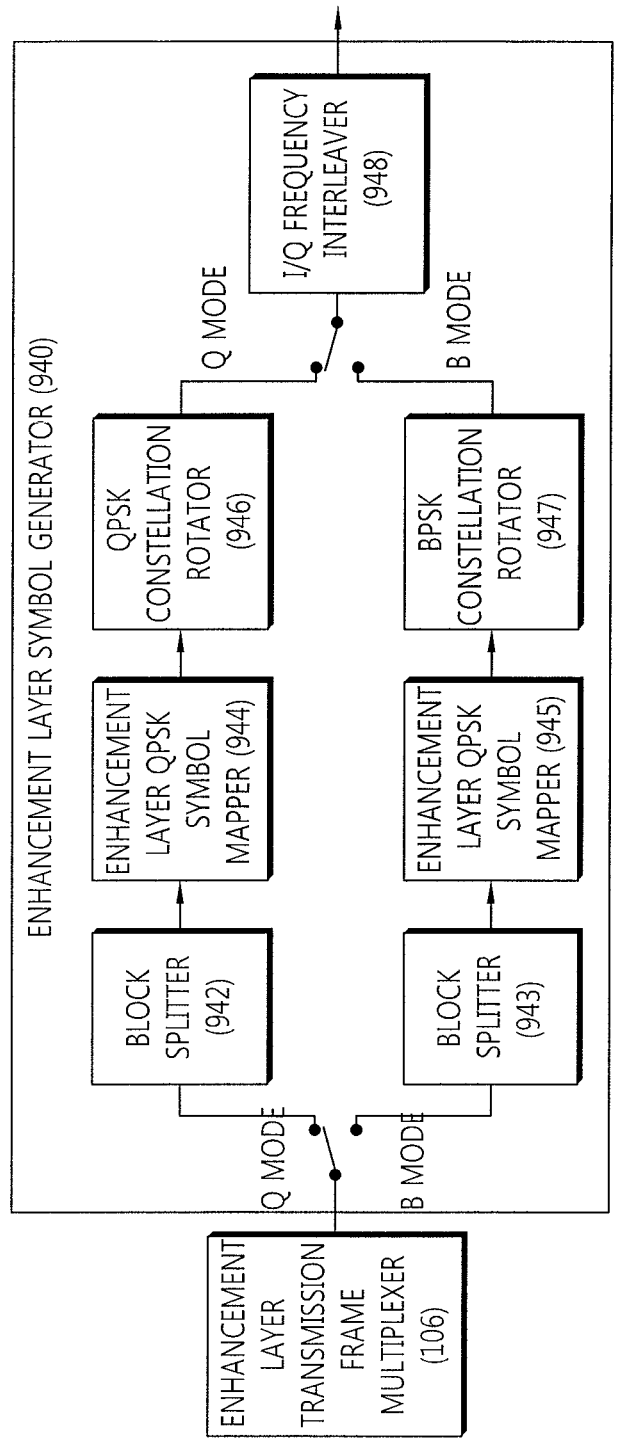
FIG. 9 is a block diagram showing an example of the enhancement layer symbol generator to which the constellation rotation is applied, according to the exemplary embodiment of the present invention.

FIG. 9 is a block diagram showing an example of applying the separate interleaving to the constellation rotation and the in-phase (I) component and the quadrature-phase (Q) component of the constellation-rotated symbols in the enhancement layer symbol generator of the AT-DMB transmitter according to the exemplary embodiment of the present invention. The enhancement layer symbol generator may be the enhancement layer FIC and MSC symbol generator.

Referring to FIG. 9, as compared with the enhancement layer symbol generator 840 of FIG. 8, an enhancement layer symbol generator 940 includes an I/Q frequency interleaver 948, instead, of the frequency interleaver 848. The I/Q frequency interleaver 948 means the frequency interleaver that performs the interleaving of different patterns on the second layer signal (or the enhancement layer signal) for each the in-phase (I) component and the quadrature-phase (Q) component.

In order to maximize the diversity gain of the constellation rotation, the constellation rotation is coupled with the interleaving technology, in particular, the interleaving of different patterns is applied to each of the in-phase (I) component and the quadrature-phase (Q) component of the symbols of the constellation-rotated second layer signal, respectively. A new frequency interleaver (the I/Q frequency interleaver 948) performing the interleaving of different patterns for each I/Q component is used, instead of using the frequency interleaver applying the frequency interleaving in a symbol unit without differentiating the I/Q for the second layer signal (or the enhancement layer signal).

Figure 10:
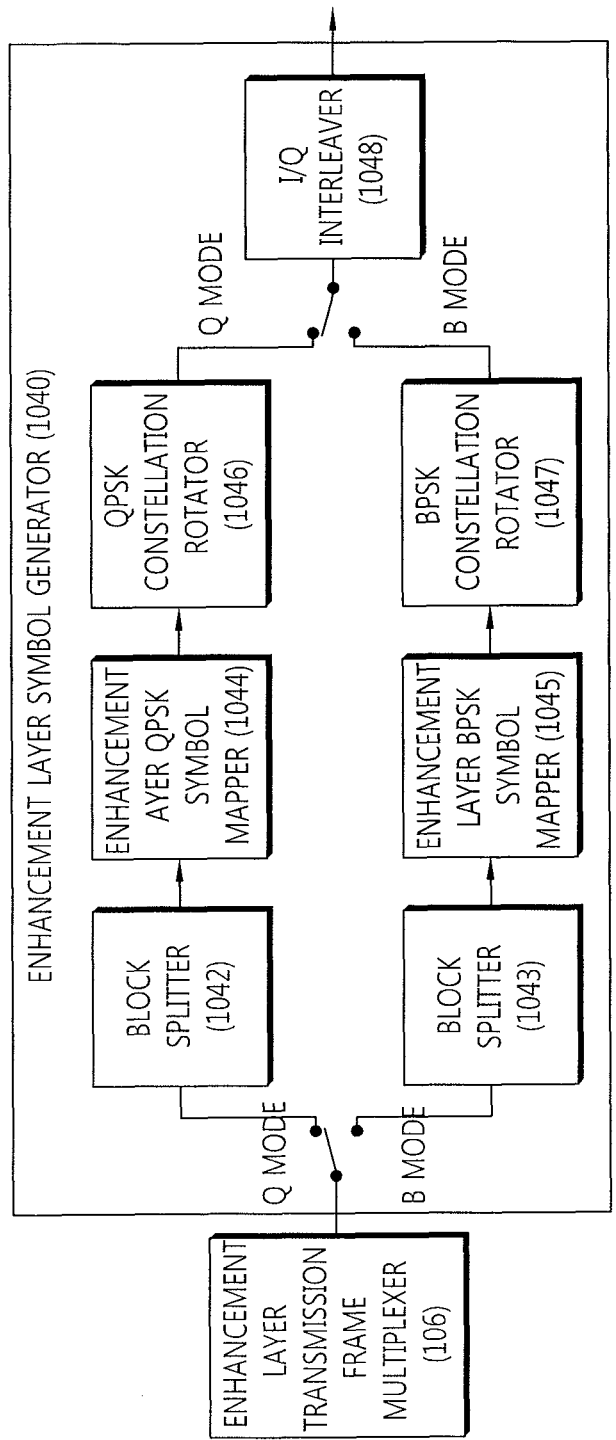
FIG. 10 is a block diagram showing another example of an enhancement layer symbol generator to which the constellation rotation is applied, according to the exemplary embodiment of the present invention.

FIG. 10 is a block diagram showing another example of applying the separate interleaving to the constellation rotation and the in-phase (I) component and the quadrature-phase (Q) component of the constellation-rotated symbols in the enhancement layer symbol generator of the AT-DMB transmitter according to the exemplary embodiment of the present invention. The enhancement layer symbol generator may be the enhancement FIC and MSC symbol generator.

Referring to FIG. 10, as compared with the enhancement layer symbol generators 840 and 940 of FIG. 8 or 9, an enhancement layer symbol generator 1040 includes an I/Q interleaver 1048. The I/Q interleaver 1048 may be more generalized to have an interleaving depth deeper than the frequency interleaver 848 and means an interleaver that performs the interleaving of different patterns on the I/Q components, respectively, to the deeper interleaving depth over a plurality of OFDM symbols as long as the increase in signal processing latency and complexity due to the increase in interleaving depth is included in an allowable range.

The I/Q frequency interleaver interleaves the I/Q components, respectively, between subcarriers configuring each OFDM symbol of the T-DMB signals and thus, the diversity gain is limited to channel spectrum characteristics within a single OFDM symbol section. Therefore, the I/Q frequency interleaver can more increase the diversity gain by using the interleaver having the deeper interleaving depth over the plurality of OFDM symbols as long as the increase in signal processing latency and complexity due to the increase in interleaving depth is included in an allowable range.

Figure 11:
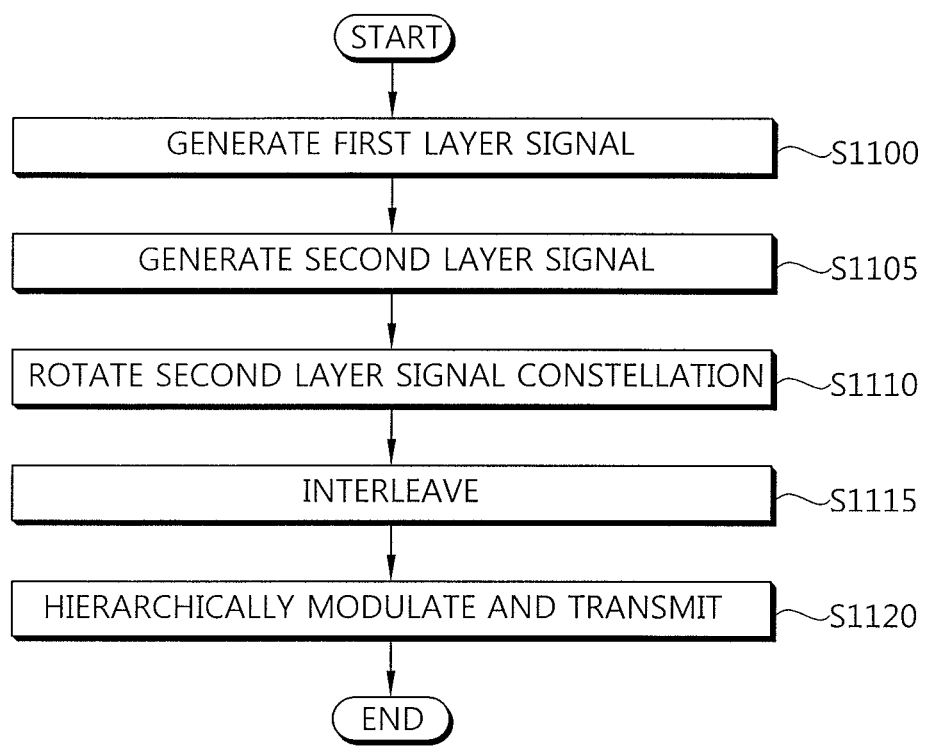
FIG. 11 is a diagram showing an example of a method of transmitting signals by a transmitter according to an exemplary embodiment of the present invention.

FIG. 11 is a diagram showing a method of transmitting signals by a transmitter according to an exemplary embodiment of the present invention.

Referring to FIG. 11, the transmitter generates the first layer signal (S1100). For example, the transmitter may be the transmitter that is operated in the AT-DMB system.

The second layer signal synchronized with the first layer signal and having different signal powers is generated (S1105).

The constellation rotation rotating bundles configured as the constellation points formed by the second layer signal by a predetermined angle is performed (S1110).

For example, in the AT-DMB, the transmitter may be operated in one of the B mode constellation-rotating the BPSK symbols or the Q mode constellation-rotating the QPSK symbols.

For example, the symbols of the second layer signal are mapped and the constellation rotation may be performed based on the mapped symbols.

In this case, the predetermined angle may be set as a value for maximizing the diversity gain. As another example, the predetermined angle may be set to be different values according to the modulation scheme of the second layer signal.

The interleaving on the second layer signal is performed (S1115).

For example, the transmitter performs the interleaving of different patterns on the symbols of the constellation-rotated second layer signal for each in-phase (I) component and quadrature-phase (Q) component.

As another example, the transmitter performs the frequency interleaving of different patterns on the in-phase component and the quadrature-phase component of the symbols of the constellation-rotated second layer signal, respectively.

As another example, the transmitter performs the interleaving on the in-phase component and the quadrature-phase component of the symbols of the constellation-rotated second layer signal, respectively, over the plurality of OFDM symbols and frequencies.

The transmitter hierarchically modulates and transmits the first layer signal and the second layer signal (S1120).

Figure 12:
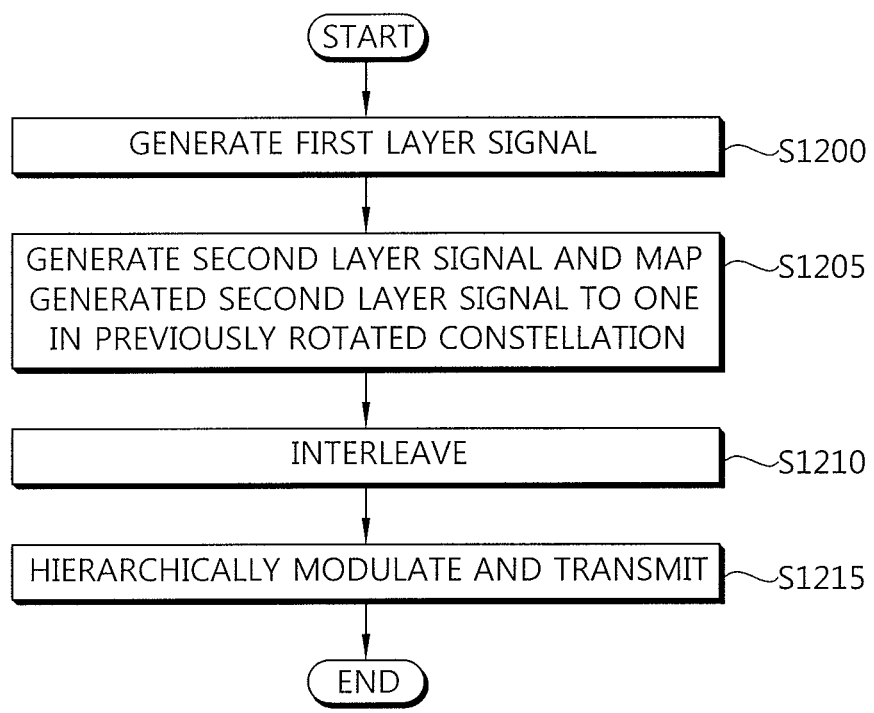
FIG. 12 is a diagram showing another example of a method of transmitting signals by a transmitter according to an exemplary embodiment of the present invention.

FIG. 12 is a diagram showing another example of a method of transmitting signals by a transmitter according to an exemplary embodiment of the present invention.

The transmitter generates the first layer signal (S1200). For example, the transmitter may be the transmitter that is operated in the AT-DMB system.

The transmitter performs the constellation rotation that rotates the bundles configured as the constellation points funned by the second layer signal by the predetermined angle while generating the second layer signal synchronized with the first layer signal and having different signal power (S1205).

That is, previously rotated (subjected to the interleaving) second layer signal constellations are put in a predetermined look up table (LUT) and may be simply mapped to one symbol in the previously rotated constellations according to a bitstream to be transmitted to the second layer signal.

For example, in the AT-DMB, the transmitter may be operated in one of the B mode constellation-rotating the BPSK symbols or the Q mode constellation-rotating the QPSK symbols.

In this case, the predetermined angle may be set to be a value to maximize the diversity gain. As another example, the predetermined angle may be set to be different values according to the modulation scheme of the second layer sigma.

The transmitter performs the interleaving on the second layer signal (S1210).

For example, the transmitter performs the interleaving of different patterns on the in-phase (I) component and the quadrature-phase (Q) component of the symbols of the constellation-rotated second layer signal, respectively.

As another example, the transmitter performs the frequency interleaving of different patterns on the in-phase component and the quadrature-phase component of the symbols of the constellation-rotated second layer signal, respectively.

As another example, the transmitter performs the interleaving on the in-phase component and the quadrature-phase component of the symbols of the constellation-rotated second layer signal, respectively, over the plurality of OFDM symbols and frequencies.

The transmitter hierarchically modulates and transmits the first layer signal and the second layer signal (S1215).

As another example of a method of transmitting signals by a transmitter, the constellation of the last hierarchically modulated signal is put in the look up table (LUT) and is simply mapped to one symbol in the constellations of the last hierarchically modulated signal according to the bitstreams of the first layer and the second layer generated while generating the first layer signal and the second layer signal, thereby transmitting the signal at a time.

In this case, the interleaving is performed on the second layer signal. For example, the interleaving of different patterns are performed on the in-phase (I) component and the quadrature-phase (Q) component of the symbols of the constellation-rotated second layer signal, respectively. As another example, the frequency interleaving of different patterns is performed on the in-phase component and the quadrature-phase component of the symbols of the second layer signal, respectively. As another example, the interleaving is performed on the in-phase component and the quadrature-phase component of the symbols of the constellation-rotated second layer signal, respectively, over the plurality of OFDM symbols and frequencies.

Meanwhile, the specification describes a configuration of the present invention under the assumption of the AT-DMB system as an example for convenience of explanation. However, the configuration of the present invention may be applied to all the transmission systems using the hierarchical modulation technology including the non-uniform constellation modulation of the DVB-T and the DVB-S2 and all modifications for convenience of implementation within logically and mathematically equivalent scope are included in the scope of the present invention.

According to the exemplary embodiment of the present invention, it is possible to improve the receive performance of the second layer signal by applying the constellation rotation technology to the second layer signal in regards of the signal transmission system using the hierarchical modulation technology.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:

1. A transmitter for transmitting signals in radio communication systems, comprising:
a basic layer symbol generator generating a first layer signal;
an enhancement layer symbol generator generating a second layer signal synchronized with the first layer signal and having different signal power; and
a hierarchical modulator hierarchically modulating the first layer signal and the second layer signal, wherein the enhancement layer symbol generator performs constellation rotation rotating bundles configured as constellation points formed by the second layer signal by a predetermined angle, wherein the predetermined angle is set to have different values according to a modulation scheme of the second layer signal.

2. The transmitter of claim 1, wherein the enhancement layer symbol generator is operated in one of a B mode constellation-rotating binary phase shift keying (BPSK) symbols and a Q mode constellation-rotating quadrature phase shift keying (QPSK) symbols.

3. The transmitter of claim 1, wherein the enhancement layer symbol generator further includes a constellation rotator that performs the constellation rotation after mapping the symbols of the second layer signal.

4. The transmitter of claim 3, wherein the constellation rotator is one of the BPSK constellation rotator constellation-rotating BPSK symbols and QPSK constellation rotator constellation-rotating the QPSK symbols.

5. The transmitter of claim 1, wherein the enhancement layer symbol generator further includes a frequency interleaver that performs interleaving on the symbols of the constellation-rotated second layer signal and transmits the interleaved symbols to the hierarchical modulator.

6. The transmitter of claim 5, wherein the frequency interleaver performs interleaving of different patterns on in-phase component and quadrature-phase component of the symbols of the constellation-rotated second layer signal, respectively.

7. The transmitter of claim 1, wherein the enhancement layer symbol generator further includes an interleaver that performs interleaving on in-phase component and quadrature-phase component of the symbols of the constellation-rotated second layer signal, respectively, over a plurality of OFDM symbols.

8. The transmitter of claim 1, wherein the predetermined angle is set as a value for maximizing a diversity gain.

9. The transmitter of claim 1, wherein the radio communication system is an advanced terrestrial-digital multimedia broadcasting (AT-DMB) system.

10. A method of transmitting signals by a transmitter in radio communication systems, comprising: generating a first layer signal;

generating a second layer signal synchronized with the first layer signal and having different signal power;

performing constellation rotation rotating bundles configured as constellation points formed by the second layer signal by a predetermined angle; and hierarchically modulating and transmitting the first layer signal and the second layer signal, wherein the predetermined angle is set to have different values according to a modulation scheme of the second layer signal.

11. The method of claim 10, wherein the performing of the constellation rotation is operated in one of a B mode constellation-rotating binary phase shift keying (BPSK) symbols and a Q mode constellation-rotating a quadrature phase shift keying (QPSK) symbols.

12. The method of claim 10, further comprising: mapping symbols of the second layer signal, wherein the constellation rotation is performed based on the mapped symbols.

13. The method of claim 10, further comprising: interleaving the symbols of the constellation-rotated second layer signal, wherein the symbols of the interleaved second layer signal are hierarchically modulated and transmitted.

14. The method of claim 10, wherein the interleaving performs interleaving of different patterns on in-phase component and quadrature-phase component of the symbols of the constellation-rotated second layer signal, respectively.

15. The method of claim 10, wherein the interleaving performs interleaving on in-phase component and quadrature-phase component of the symbols of the constellation-rotated second layer signal, respectively, over a plurality of OFDM symbols.

16. The method of claim 10, wherein the predetermined angle is set as a value for maximizing a diversity gain.

17. The method according to claim 10, wherein the constellation rotation includes rotating a phase of the second layer signal by the same angle as a phase of the first layer signal and adding the second layer signal to the first layer signal during a process for reducing the power of the second layer signal to which the constellation rotation is applied.

18. A method of transmitting signals by a transmitter in radio communication systems, comprising:

generating a first layer signal;

generating a second layer signal;

performing constellation rotation rotating bundles configured as constellation points formed by the second layer signal by a predetermined angle; and hierarchically modulating and transmitting the first layer signal and the second layer signal, wherein the predetermined angle is set to have different values according to whether a modulation scheme of the second layer signal is a B mode binary phase shift keying or a Q mode quadrature phase shift keying.

* * * * *